(12) United States Patent
Baisley

(10) Patent No.: US 7,334,214 B1
(45) Date of Patent: Feb. 19, 2008

(54) MODELING REFLEXIVE INVERSE ASSOCIATIONS USING UNIFIED MODELING LANGUAGE

(75) Inventor: Donald Edward Baisley, Laguna Hills, CA (US)

(73) Assignee: Unisys Corporation, Blue Bell, PA (US)

( * ) Notice: Subject to any disclaimer, the term of this patent is extended or adjusted under 35 U.S.C. 154(b) by 611 days.

(21) Appl. No.: 10/323,483

(22) Filed: Dec. 18, 2002

(51) Int. Cl.
*G06F 9/44* (2006.01)
(52) U.S. Cl. ..................................... 717/104; 717/105
(58) Field of Classification Search ........ 717/104–116; 707/103 R
See application file for complete search history.

(56) References Cited

U.S. PATENT DOCUMENTS

| | | | |
|---|---|---|---|
| 6,401,100 B1 * | 6/2002 | Gladieux | 707/103 |
| 6,704,744 B1 * | 3/2004 | Williamson et al. | 707/103 |
| 2005/0034107 A1 * | 2/2005 | Kendall et al. | 717/104 |

OTHER PUBLICATIONS

Mellor et al., Executalbe UML: A Foundation for Model-Driven Architecture, May 2002, Addison Wesley Professional, ISBN: 0-201-74804-5.*

* cited by examiner

*Primary Examiner*—Meng-Al T. An
*Assistant Examiner*—Insun Kang
(74) *Attorney, Agent, or Firm*—Phuong-Quan Hoang; Robert P. Marley; Charles A. Johnson

(57) ABSTRACT

An embodiment of the invention is a method for modeling a reflexive inverse relationship in a computer system. A general association representing the reflexive inverse relationship is created. The general association has a named end and an unnamed end. A specific association having the general association as a generalization is created. The specific association has a first specific end and a second specific end. The first specific end is used to redefine the named end of the general association. The second specific end is also used to redefine the named end of the general association.

18 Claims, 3 Drawing Sheets

US 7,334,214 B1

MODELING REFLEXIVE INVERSE ASSOCIATIONS USING UNIFIED MODELING LANGUAGE

BACKGROUND OF THE INVENTION

1. Field of the Invention

The present invention relates in general to the field of information modeling using the Unified Modeling Language (UML), and in particular to a method for modeling reflexive inverse associations via the Unified Modeling Language (UML).

2. Description of Related Art

For ease of understanding and clarity, the terms that will be used hereinafter are defined as follows.

The Unified Modeling Language (UML) is a language used for defining models of software and information systems. In UML, a model is a package of model elements, such as classes, associations, and generalizations.

A "class" is a classification of objects. An "object" is an abstract representation of a concept or a thing. For example, a class called BankAccount can be a classification of objects representing individual accounts in a banking system. Another class, Customer, can classify objects representing customers.

An "association" is a classification of links. A "link" represents a relationship between objects. An association has two or more ends that specify the types of objects that can be related. A link of an association has one object for each end representing that a relationship occurs between the linked objects. A "binary association" is an association with two ends such that each link relates an object represented by one end to an object represented by the other end.

A "generalization" specifies that one classification is a subclassification of another. For example, a class Customer could be a subclassification of another class Person. The meaning of the generalization in this case is that every Customer object is also a Person object. A generalization can also occur between two associations, indicating that every link of a specific association is also a link of a more general association. Generalization of associations occurs where a relationship represented by a link of a specific association is stated more generally as a relationship of a general association. For example, a parent-to-child association is a generalization of a father-to-child association, since every father-to-child link is, at the same time, a parent-to-child link. A generalization between two associations requires that there be a correspondence, called "end redefinition" between the ends of the two associations. Each end of a general association is redefined by an end of a specific association. In the example above, the father end of the father-to-child association redefines the parent end of the parent-to-child association, and the child end of the father-to-child association redefines the child end of the parent-to-child association. Based on the end redefinitions, the father in a father-to-child link is the parent (and not the child) in a parent-to-child link.

A class or an association (also denoted by the general term "classifier") can be modeled as "abstract", meaning that the classification is an incomplete specification such that any instance (object or link) must also be an instance of some other classifier having the abstract classifier as a generalization.

UML associations provide an important capability for representing information in that relationships between objects are seen from perspectives of each object. For example, a parent-to-child relationship is, from the inverse perspective, a child-to-parent relationship. An association captures both perspectives at the same time. A parent-to-child link is at the same time a child-to-parent link.

However, UML associations fall short of modeling reflexive inverse relationships, which are binary relationships where both ends represent the same role. For example, a parent-to-child relationship is easily modeled, but relative-to-relative relationship is not. Or, husband-to-wife relationship is easily modeled, but spouse-to-spouse is not. The problem arises because each end of an association is distinct. The two ends of a binary association cannot be the same end.

Because of this problem, reflexive inverse relationships tend to be only partially modeled in UML. The partial model is an association having a named end and an unnamed end. For example, a relative-to-relative relationship is modeled as an association with one end named relative, and no name on the other end. But this model is incomplete because it fails to capture important semantics, which are, first, that the inverse of relative is relative, and second, that a link representing a first Person being a relative of a second Person is at the same time a link representing the second Person being a relative of the first Person.

The lack of a method to capture the semantics of reflexive inverse relationships in UML limits what can be expressed in models for human understanding. More importantly, since automatic generation from UML models is an important part of modern software development process, this limitation also prevents proper generation of software and databases from UML models.

Outside of UML there is another approach to modeling relationships used in semantic data modeling and used by some metadata repositories that supports reflexive inverse relationships. This approach does not model relationships as classifications of links, but rather it models references from one object to another. A reference specified for a class can be related to another reference (in the same class or another) that represents the inverse perspective on the same relationship. For example, a parent reference in a Person class can be the inverse of a child reference in a Person class. This approach to modeling relationships allows a reference to be its own inverse. However, this approach is not compatible with UML modeling of associations, nor does it capture the important UML concept that relationships can be classified and generalized.

There is a need for a method to support modeling of reflexive inverse relationships in UML using associations that can be classified and generalized. The semantics of reflexive inverse relationships must be captured in the structure of a model so that automatic generation tools can generate correct software and databases. There is also a need to be able to easily translate reflexive inverse relationships from semantic data models into UML associations.

BRIEF DESCRIPTION OF THE DRAWINGS

The invention may best be understood by referring to the following description and accompanying drawings that are used to illustrate embodiments of the invention. In the drawings.

SUMMARY OF THE INVENTION

An embodiment of the invention is a method for modeling a reflexive inverse relationship in a computer system. A general association representing the reflexive inverse relationship is created. The general association has a named end and an unnamed end. A specific association having the general association as a generalization is created. The specific association has a first specific end and a second specific end. The first specific end is used to redefine the named end of the general association. The second specific end is also used to redefine the named end of the general association.

DETAILED DESCRIPTION

One embodiment of the present invention is a method for modeling reflexive inverse associations using the Unified Modeling Language (UML).

UML can be used to model objects, not only for object-oriented languages and environments such as C++, Java, and C#, but also for non-object-oriented applications. UML can also be used to model Information, Transactional, Real-time, and Fault-Tolerant systems.

The ability to fully capture semantics of reflexive inverse relationship in a UML model is important in all applications, but especially when UML models are used by software tools to generate software components and database schemata. Reflexive inverse relationships are common in business information models that must be translated into databases and software applications. Failure to properly capture reflexive inverse semantics in a model leads to incorrect or incomplete generation of schemata and software.

Currently known methods for modeling reflexive inverse associations describe the reflexive inverse property as constraint expressions. Such methods have to depend on software tools being able to interpret arbitrary constraint expressions. In contrast, the method of the present invention has no dependency on such ability of software tools, since it expresses reflexive inverse associations as models that can be readily used by automated tools to generate software for manipulating and storing data.

The method of the present invention can also be used to support translation of non-UML models having reflexive inverse references into UML associations.

An advantage of the present invention over current methods is that reflexive inverse associations are modeled in a way that structurally specifies essential link semantics. In other words, for two objects, A and B, a link relating A to B is at the same time a link relating B to A by the same association.

Figure 1:
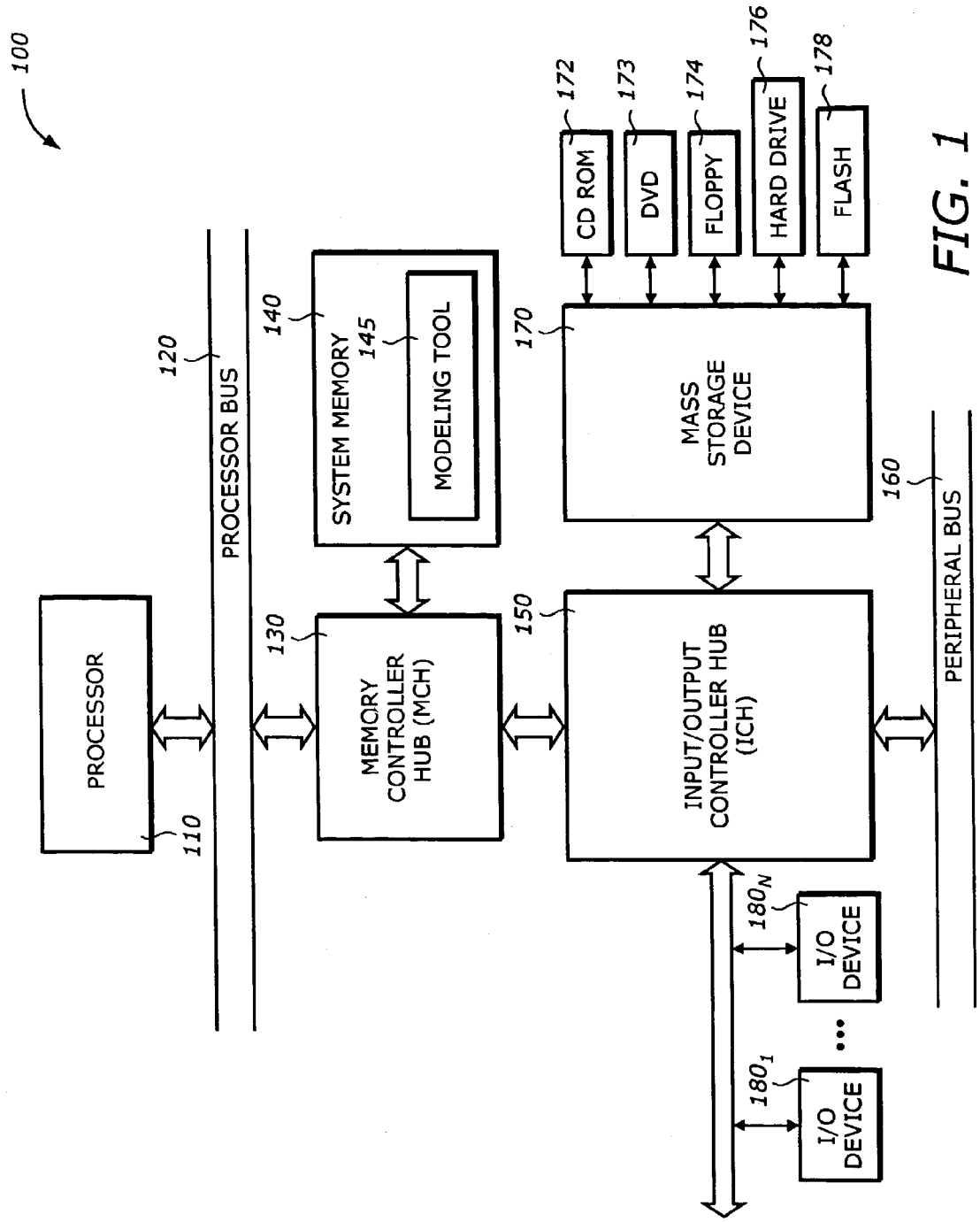
FIG. 1 is a diagram illustrating a system in which one embodiment of the invention can be practiced.

FIG. 1 is a diagram illustrating a system 100 in which one embodiment of the invention can be practiced. The system 100 includes a processor 110, a processor bus 120, a memory control hub (MCH) 130, a system memory 140, an input/output control hub (ICH) 150, a mass storage device 170, and input/output devices $180_1$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The processor bus 120 may support a uni-processor or multiprocessor configuration. The processor bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces with the peripheral bus 160. For clarity, not all the peripheral buses are shown. It is contemplated that the system may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a modeling tool 145. Any one of the elements of the modeling tool 145 may be implemented by hardware, software, firmware, microcode, or any combination thereof. The system memory 140 may also include other programs or data which are not shown, such as an operating system. The modeling tool 145 contains program code that, when executed by the processor 110, causes the processor 110 to perform operations comprised in the method of the present invention as described below. The outputs of the modeling tool 145 are models that may be stored in the system memory 140 or in other storage devices.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface with the peripheral bus 160, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, hard drive 176, flash memory 178, and any other magnetic or optic storage devices. The mass storage device 170 provides a mechanism to read machine-accessible media. The machine-accessible media may contain computer readable program code to perform tasks as described hereinafter.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

The system 100 may interface to a number of other systems or devices including a MOF repository. The modeling tool 145 may interface to other programs located in the system 100 or in any other systems or servers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

Figure 2:
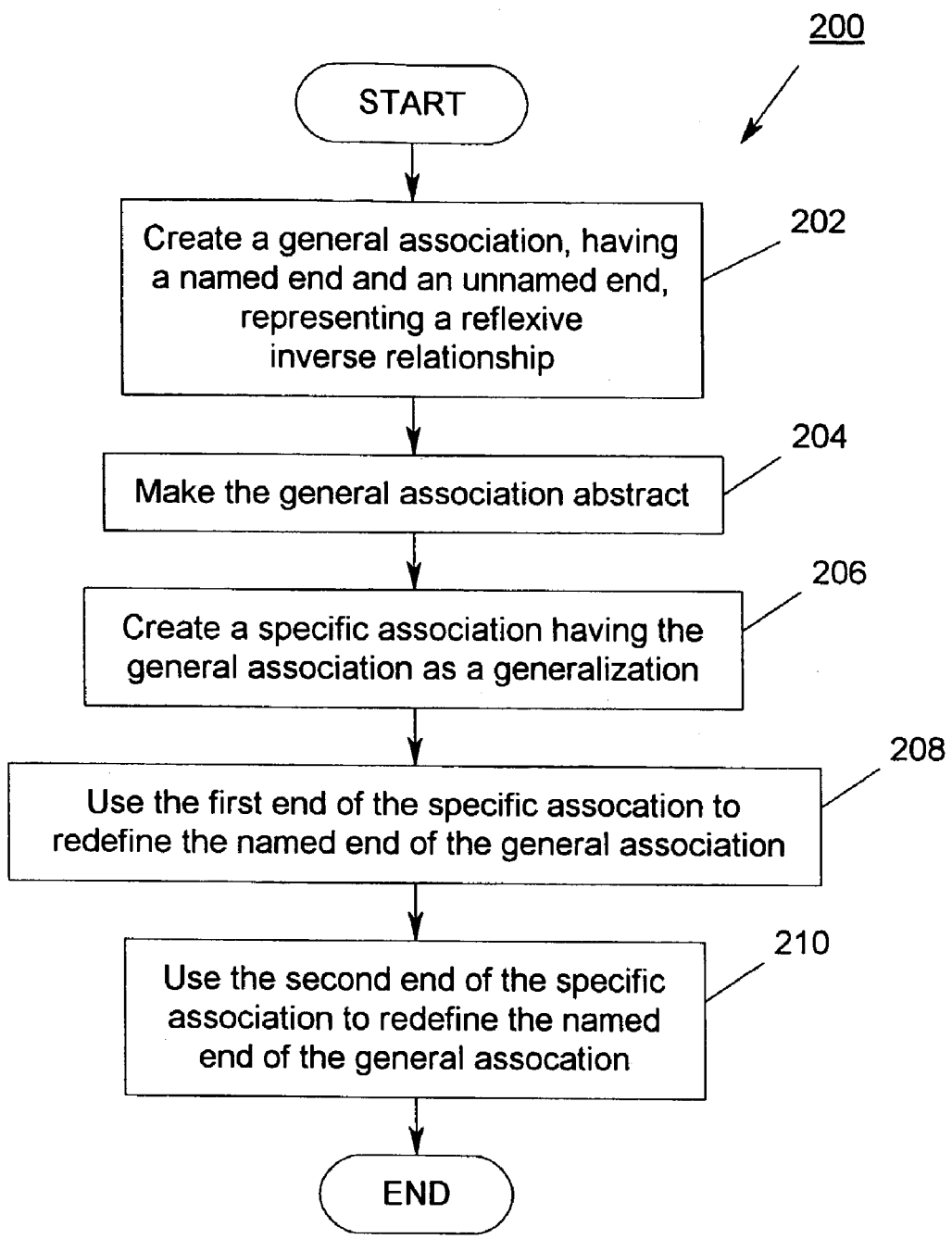
FIG. 2 is a flowchart illustrating one embodiment of the method of the present invention.

FIG. 2 is a flowchart illustrating one embodiment of the method of the present invention.

Upon Start, process 200 creates a general binary association representing a reflexive inverse relationship (block 202). The general association has a named end and an unnamed end. The name should be chosen such that the meaning of the name corresponds to the reflexive inverse relationship. This general association will be a reflexive inverse association. Process 200 makes the general association abstract (block 204). Making the general association abstract prevents creation of any links of the general association that are not more specifically classified by another association. This operation of abstracting prevents creation of any links that do not preserve the reflexive inverse semantics provided by a subsequent specific association. In other words, with the general association being abstract, every created link of the association must be a reflexive inverse link. This operation of abstracting may be employed in some applications, but is an optional operation in the method of the present invention, since, without this operation of abstracting, the general association can still support reflexive inverse links.

After creating the general association, process 200 creates a specific association having the general association as a generalization (block 206). The specific association has a first end and a second end. Process 200 uses the first end of the specific association to redefine the named end of the general binary association (block 208). This operation implicitly causes the second end of the specific association to redefine the unnamed end of the general association. Process 200 also uses the second end of the specific association to redefine the named end of the general binary association (block 210). This operation implicitly causes the second end of the specific association to redefine the unnamed end of the general association. Thus, in effect, the operations in block 208 and block 210 result in a single link of the specific association representing a relationship in one direction being a link of the general association in both directions, which are inverses of each other, and thus simultaneously representing the relationship of the general association in both directions. The combination of operations in block 208 and 210 is different from normal modeling practice. Normal modeling practice is to define generalizations across associations such that one end of a specific association corresponds to one end only, not two ends, of a general association. Here, each end of the specific association redefines both ends of the general association.

A model created using the method operations described above specifies a reflexive inverse association. A link of the reflexive inverse association (i.e., a link of the general association created in block 202) is always a link of a specific association (block 206) that makes the link to be not only a link from a first object to a second object, but also at the same time, a link with the same meaning from the second object to the first object.

Figure 3:
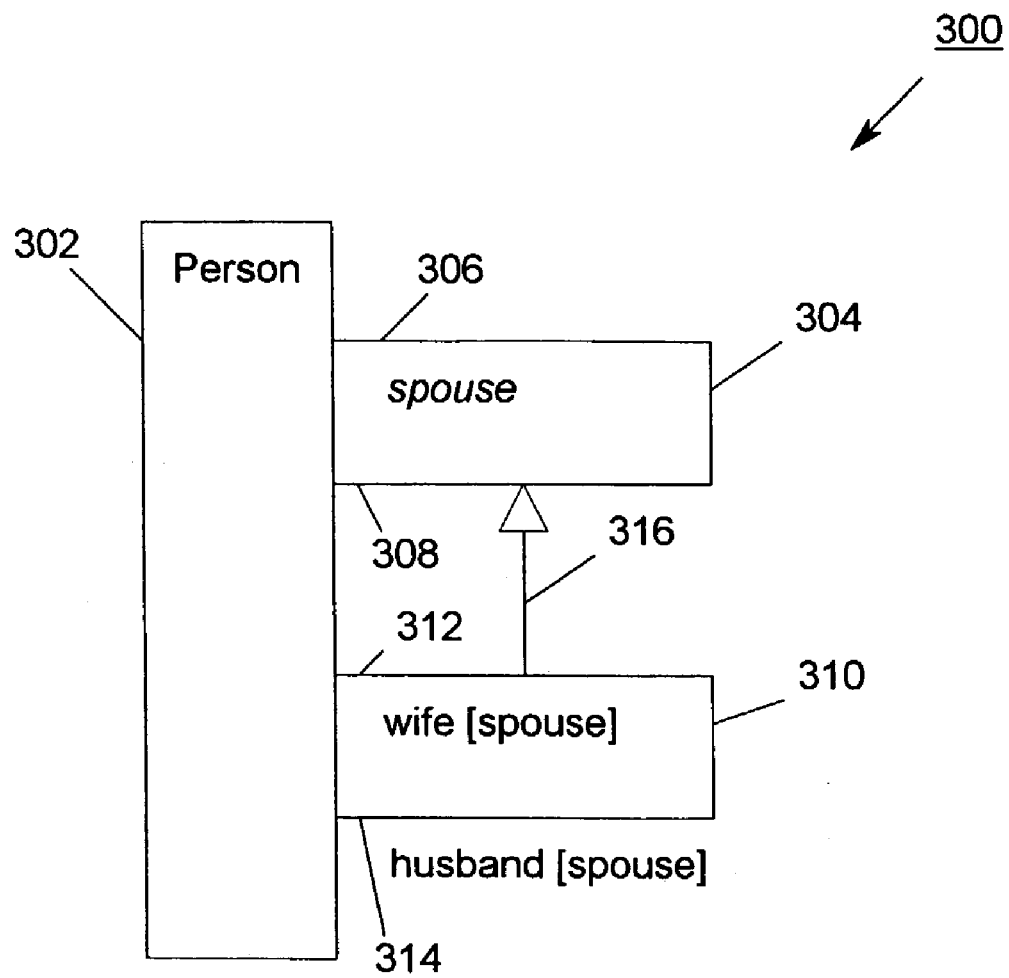
FIG. 3 is a UML diagram showing an exemplary application of the present invention to create a reflexive inverse association for a spouse-to-spouse relationship.

FIG. 3 is a UML diagram of an exemplary model resulting from utilizing the method of the present invention. The example shows a reflective inverse association between persons that relates a spouse to a spouse. In the diagram 300, the box 302 labeled "Person" represents a class named Person. A line 304 that starts and ends at the Person box 302 has a named end 306 and an unnamed end 308. The named end 306 has the name "spouse". Line 304 represents a general association that is made to be a reflexive inverse association by the method of the present invention. The general association 304 is created by process 200 in block 202 (FIG. 2). The general association is made abstract by process 200 in block 204 (FIG. 2). The name "spouse" is italicized in the diagram to show that the general association is abstract (recall that the operation of abstracting the general association is optional). Line 310, which starts and ends at the Person box 302, has the name "husband" on one end and "wife" on the other end. This line 310 represents a specific association that relates a "husband" to his "wife". The arrow 316 between the two association lines 310 and 304 indicates that the spouse association is a generalization of the husband-to-wife association. The specific association 310 is created by process 200 in block 206 (FIG. 2). The name "spouse" appearing in square brackets at each of the ends 312 and 314 of the husband-to-wife association represents that each of these ends redefines the spouse end of the other association. This redefinition was performed by process 200 in blocks 208 and 210 (FIG. 2).

Note that the husband and wife ends 312 and 314 of the husband-to-wife association 310 are not required to be of type Person. They can alternately have types that are specializations of Person, such as, for example, Man and Woman.

In some cases there are multiple associations that specialize a reflexive inverse association. For example, a relative-to-relative reflexive inverse association relating one Person to another can be a generalization of several specific associations, such as parent-to-child, grandparent-to-grandchild, uncle-to-nephew, etc. Following the operations in block 208 and 210 (FIG. 2) of the method of the present invention, each end of each of these specific associations would redefine the named end relative of the reflexive inverse association.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for modeling a reflexive inverse relationship, the method comprising the operations of:
    (a) creating a general association representing the reflexive inverse relationship, the general association having a named end and an unnamed end, the general association being stored in a memory of a computer;
    (b) creating a specific association having the general association as a generalization, the specific association having a first specific end and a second specific end, the specific association being stored in the memory of the computer;
    (c) using the first specific end to redefine the named end of the general association; and
    (d) using the second specific end to redefine the named end of the general association.

2. The method of claim 1 wherein operation (a) further comprises:
    making the general association abstract.

3. The method of claim 1 wherein operation (c) comprises the operation of using the second specific end to redefine the unnamed end of the general association.

4. The method of claim 1 wherein operation (d) comprises the operation of using the first specific end to redefine the unnamed end of the general association.

5. The method of claim 1 wherein the operations are performed via Unified Modeling Language.

6. The method of claim 1 wherein the operations are performed in an object-oriented environment.

7. An article of manufacture comprising:
    a machine-accessible storage medium including data that, when accessed by a machine, cause the machine to perform operations comprising:
    (a) creating a general association representing a reflexive inverse relationship, the general association having a named end and an unnamed end;
    (b) creating a specific association having the general association as a generalization, the specific association having a first specific end and a second specific end;
    (c) using the first specific end to redefine the named end of the general association; and
    (d) using the second specific end to redefine the named end of the general association.

8. The article of manufacture of claim 7 wherein operation (a) further comprises:
    making the general association abstract.

9. The article of manufacture of claim 7 wherein operation (c) comprises the operation of using the second specific end to redefine the unnamed end of the general association.

10. The article of manufacture of claim 7 wherein operation (d) comprises the operation of using the first specific end to redefine the unnamed end of the general association.

11. The article of manufacture of claim 7 wherein the operations are performed via Unified Modeling Language.

12. The article of manufacture of claim 7 wherein the operations are performed in an object-oriented environment.

13. A system comprising:
    a processor; and
    a memory coupled to the processor, the memory containing program code that, when executed by the processor, causes the processor to perform operations comprising:
    (a) creating a general association representing a reflexive inverse relationship, the general association having a named end and an unnamed end;
    (b) creating a specific association having the general association as a generalization, the specific association having a first specific end and a second specific end;
    (c) using the first specific end to redefine the named end of the general association; and
    (d) using the second specific end to redefine the named end of the general association.

14. The system of claim 13 wherein operation (a) further comprises:
    making the general association abstract.

15. The system of claim 13 wherein operation (c) comprises the operation of using the second specific end to redefine the unnamed end of the general association.

16. The system of claim 13 wherein operation (d) comprises the operation of using the first specific end to redefine the unnamed end of the general association.

17. The system of claim 13 wherein the operations are performed via Unified Modeling Language.

18. The system of claim 13 wherein the operations are performed in an object-oriented environment.

* * * * *